US011945362B2

(12) United States Patent
Nakamura et al.

(10) Patent No.: US 11,945,362 B2
(45) Date of Patent: Apr. 2, 2024

(54) AIRCRAFT LAMP

(71) Applicant: KOITO MANUFACTURING CO., LTD., Tokyo (JP)

(72) Inventors: Kazuyoshi Nakamura, Shizuoka (JP); Takashi Yoda, Shizuoka (JP); Masaru Ishikiriyama, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/625,593

(22) PCT Filed: Jul. 9, 2020

(86) PCT No.: PCT/JP2020/026816
§ 371 (c)(1),
(2) Date: Jan. 7, 2022

(87) PCT Pub. No.: WO2021/010270
PCT Pub. Date: Jan. 21, 2021

(65) Prior Publication Data
US 2022/0281376 A1 Sep. 8, 2022

(30) Foreign Application Priority Data

Jul. 12, 2019 (JP) .................................. 2019-130109
Aug. 6, 2019 (JP) .................................. 2019-144340

(51) Int. Cl.
*B60Q 1/00* (2006.01)
*B64D 47/06* (2006.01)
(Continued)

(52) U.S. Cl.
CPC ........... *B60Q 1/0094* (2013.01); *B64D 47/06* (2013.01); *F21V 23/06* (2013.01); *F21V 29/503* (2015.01);
(Continued)

(58) Field of Classification Search
CPC .. B60Q 1/0094; B64D 47/06; B64D 2203/00; B64D 47/02; F21V 23/06; F21V 29/503; F21V 29/76; F21Y 2115/10
See application file for complete search history.

(56) References Cited

U.S. PATENT DOCUMENTS 8,297,811 B2 * 10/2012 Mukai .................. B60Q 1/0094
362/519
8,430,524 B2 * 4/2013 Chen ..................... F21V 7/0058
362/240
(Continued)

FOREIGN PATENT DOCUMENTS

| JP | 2010-033840 A | 2/2010 |
| JP | 2010-033841 A | 2/2010 |

(Continued)

OTHER PUBLICATIONS

International Search Report dated Aug. 11, 2020 for WO 2021/010270 A1 (4 pages).
(Continued)

*Primary Examiner* — Tsion Tumebo
(74) *Attorney, Agent, or Firm* — Venjuris, P.C.

(57) ABSTRACT

An aircraft lamp includes: a lamp outer housing configured by a lamp housing having an opening and a cover attached to the lamp housing in a state where the opening is closed, wherein an internal space is formed in the lamp housing as a first arrangement space; and a lamp unit that includes a light source module provided with a light source, an attaching base to which the light source module is attached, and a power receiving connector attached to the attaching base to supply power to the light source, wherein the lamp unit is configured to be detachable with respect to the lamp housing. The lamp housing includes an insertion hole communicating with the first arrangement space. The lamp housing
(Continued)

is provided with an arrangement case portion having a second arrangement space opened on an outer surface side of the lamp housing.

6 Claims, 10 Drawing Sheets

(51) Int. Cl.
*F21V 23/06* (2006.01)
*F21V 29/503* (2015.01)
*F21V 29/76* (2015.01)
*F21Y 115/10* (2016.01)

(52) U.S. Cl.
CPC .......... *F21V 29/76* (2015.01); *B64D 2203/00* (2013.01); *F21Y 2115/10* (2016.08)

(56) References Cited

U.S. PATENT DOCUMENTS

| | | | | |
|---|---|---|---|---|
| 8,770,774 | B2* | 7/2014 | Ye | F24F 13/078 |
| | | | | 362/330 |
| 10,837,662 | B2* | 11/2020 | Maeda | F21V 33/0088 |
| 2006/0007013 | A1* | 1/2006 | Singer | H05B 45/345 |
| | | | | 340/815.45 |
| 2013/0250586 | A1* | 9/2013 | Sasaki | F21K 9/23 |
| | | | | 362/373 |
| 2014/0063814 | A1* | 3/2014 | McGowan | F21V 15/01 |
| | | | | 362/373 |
| 2018/0334263 | A1* | 11/2018 | Hessling-Von Heimendahl | |
| | | | | F21S 41/141 |
| 2022/0017236 | A1* | 1/2022 | Hessling-Von Heimendahl | |
| | | | | B64D 47/06 |
| 2022/0106057 | A1* | 4/2022 | Mukai | F21V 23/007 |
| 2022/0252242 | A1* | 8/2022 | Tsukamoto | F21V 29/70 |

FOREIGN PATENT DOCUMENTS

| | | |
|---|---|---|
| JP | 2013-054834 A | 3/2013 |
| JP | 2013-187081 A | 9/2013 |
| JP | 2014-032812 A | 2/2014 |
| JP | 2015-138742 A | 7/2015 |

OTHER PUBLICATIONS

An Extended European Search Report dated Jul. 8, 2022, issued from the European Patent Office (EPO) of European Patent Application No. 20839821.4 (8 pages).

* cited by examiner

AIRCRAFT LAMP

CROSS REFERENCE TO RELATED APPLICATIONS

This application is a national phase of PCT application No. PCT/JP2020/026816, filed on 9 Jul. 2020, which claims priority from Japanese patent application Nos. 2019-130109 and 2019-144340, filed on 12 Jul. 2019 and 6 Aug. 2019, respectively, all of which are incorporated herein by reference.

TECHNICAL FIELD

The present disclosure relates to a technical field of an aircraft lamp used by being attached to, for example, an airframe of an aircraft.

BACKGROUND

There is an aircraft lamp including a lamp outer housing configured by a cover and a lamp housing, and a lamp unit that irradiates light emitted from a light source toward the outside (see, e.g., Patent Document 1 and Patent Document 2).

There are various types of such aircraft lamps according to usage purposes, and as external lighting, for example, there is a collision prevention light that prevents collision between aircrafts, a flight light that indicates a flight posture or a flight direction of an airframe, a landing light that irradiates a runway during take-off and landing, and a logo lamp that illuminates a logo of an airline company drawn on an airframe.

PRIOR ART DOCUMENT

Patent Document

Patent Document 1: Japanese Laid-Open Patent Publication No. 2010-033840
Patent Document 2: Japanese Laid-Open Patent Publication No. 2010-033841

SUMMARY OF THE INVENTION

Problem to be Solved

In such an aircraft lamp, it is desired to secure a good lighting state of light irradiated from the lamp unit by securing a stable driving state of the light source. However, when a problem occurs in a part of the lamp unit, there is a concern that a good driving state of the light source may not be secured, and thus, it is necessary to improve the maintainability of the lamp unit.

Therefore, the aircraft lamp according to the disclosure is to improve the maintainability of the lamp unit and to secure a good lighting state of the light irradiated from the lamp unit.

Means to Solve the Problem

First, an aircraft lamp according to the present disclosure includes: a lamp outer housing configured by a lamp housing having an opening and a cover attached to the lamp housing in a state where the opening is closed, an internal space being formed in the lamp outer housing as a first arrangement space; and a lamp unit including a light source module provided with a light source, an attaching base to which the light source module is attached, and a power receiving connector attached to the attaching base to supply power to the light source, is the lamp unit being configured to be detachable with respect to the lamp housing. The lamp housing includes an insertion hole communicating with the first arrangement space. The lamp housing is provided with an arrangement case portion having a second arrangement space opened on an outer surface side of the lamp housing. At least a part of the light source module is arranged in a state where the insertion hole is inserted in the first arrangement space. The power receiving connector is arranged in the second arrangement space.

Therefore, the lamp unit including the light source module, the attaching base, and the power receiving connector is detachable with respect to the lamp housing from the outer surface side of the lamp housing.

Second, in the aircraft lamp according to the present disclosure, the attaching base may be provided with a substrate accommodation portion having an arrangement recess and a shielding cover portion that closes the arrangement recess, a control substrate may be arranged in the arrangement recess to control an ON/OFF of the light source, and the power receiving connector may be attached to a surface of the shielding cover portion opposite to the arrangement recess.

Therefore, the power receiving connector and the control substrate are oppositely positioned across the shielding cover portion, and thus, the power receiving connector and the control substrate do not interfere with each other.

Third, in the aircraft lamp according to the present disclosure, the attaching base may be provided with an inclined surface portion inclined with respect to the cover, and a heat radiation fin protruding from one surface of the inclined surface portion in a thickness direction, and the light source module may include a substrate on which a plurality of the light sources is mounted, and may be attached to the other surface of the inclined surface portion in the thickness direction.

Therefore, the substrate and the light source are arranged in an inclined state with respect to the cover, and the heat radiation fin protrudes from the inclined surface to which the substrate is attached.

Fourth, in the aircraft lamp according to the present disclosure, an outer peripheral portion of the attaching base may be pressed against the lamp housing via an annular heat transfer sheet in a state where the lamp unit is attached to the lamp housing.

Therefore, the heat generated in the lamp unit is released from the attaching base to the outside, and is transferred to the lamp housing through the heat transfer sheet so as to be also released from the lamp housing.

Fifth, the aircraft lamp according to the present disclosure may further includes a dropout prevention wire configured to prevent the lamp unit from dropping out from the lamp housing in a state where the lamp unit is separated from the lamp housing, and both ends of the dropout prevention wire may be attached to an outer surface of the lamp housing and an outer surface of the lamp unit, respectively.

Therefore, the power receiving connector and the dropout prevention wire do not interfere with each other.

Sixth, another aircraft lamp according to the present disclosure includes: a lamp outer housing configured by a lamp housing having an opening and a cover attached to the lamp housing in a state where the opening is closed, an internal space being formed in the lamp outer housing as an arrangement space; and a lamp unit including a light source module provided with a light source, an attaching base to which the light source module is attached, a power receiving connector attached to the attaching base to supply power to the light source, and a control substrate attached to the attaching base to control an ON/OFF of the light source, is the lamp unit being configured to be detachable with respect to the lamp housing through the opening.

Therefore, it is possible to detach the lamp unit including the light source module, the attaching base, the power receiving connector, and the control substrate with respect to the lamp housing by separating the cover from the lamp housing.

Seventh, in the another aircraft lamp according to the present disclosure, a connection connector may be configured to be detachable with respect to the power receiving connector, and a detachment direction of the connection connector with respect to the power receiving connector may extend along the light source module.

Therefore, the connection connector does not interfere with the light source module in the detachment work of the connection connector with respect to the power receiving connector.

Eighth, in the aircraft lamp according to the present disclosure, the attaching base may be provided with a heat radiation fin, and heat generated in the light source module and heat generated in the control substrate may be released from the attaching base.

Therefore, both the heat generated in the light source module and the heat generated in the control substrate are released from the heat radiation fin of the attaching base, and thus, a separate member is not required to release each of the heat generated in the light source module and the heat generated in the control substrate.

Ninth, in the aircraft lamp according to the present disclosure, the attaching base may include an outer peripheral surface facing an inner peripheral surface of the lamp housing, and an attaching portion positioned inside the outer peripheral surface to which the light source module is attached, a dropout prevention wire may be provided to prevent the cover from dropping out from the lamp housing in a state where the cover is separated from the lamp housing, and the dropout prevention wire may be positioned between the inner peripheral surface and the outer peripheral surface in a state where the lamp unit is attached to the lamp housing.

Therefore, light irradiated from the light source module is not shielded by the dropout prevention wire.

Tenth, in the aircraft lamp according to the present disclosure, wherein a part of the arrangement space may serve as a space for an optical path for light irradiated from the light source module, and at least a part of a space for inserting a finger when the lamp unit is detached with respect to the lamp housing may coincide with the space for the optical path.

Therefore, it is not necessary to separately form each of the space for the optical path that serves as the path for the light irradiated from the light source module and the work space for inserting a finger when the lamp unit is detached with respect to the lamp housing.

Effect of the Invention

According to the present disclosure, since the lamp unit including the light source module, the attaching base, and the power receiving connector is detachable with respect to the lamp housing from the outer surface side of the lamp housing, it is possible to separate the lamp unit from the lamp housing without separating the lamp housing or the cover from an aircraft. Therefore, the maintainability of the lamp unit may be improved, and a good lighting state of the light irradiated from the lamp unit may be secured.

DETAILED DESCRIPTION TO EXECUTE THE INVENTION

Hereinafter, an embodiment for implementing an aircraft lamp of the present disclosure will be described with reference to the accompanying drawings.

Aircraft Lamp According to First Embodiment

First, an aircraft lamp 1 according to a first embodiment will be described.

Hereinafter, descriptions will be made on an example in which the aircraft lamp 1 according to the present disclosure is applied to a logo lamp which is an external lighting and is attached to a horizontal tail wing. However, the scope of application of the present disclosure is not limited to the logo lamp, but may be applied to other external lighting used in an aircraft.

In the aircraft lamp 1, a lamp outer housing is configured by a lamp housing and a cover. In the following descriptions, front-rear, upward-downward, and left-right directions are illustrated by setting a coupling direction of the lamp housing and the cover to a vertical direction, the cover as an upper side, and the lamp housing as a lower side. Further, the aircraft lamp 1 is attached an upper surface side of the horizontal tail wing, and with respect to the left-right direction, the vertical tail wing side is represented as the inner side in the left-right direction, and the tip side of the horizontal tail wing is represented as the outer side.

The front-rear, upward-downward, and left-right directions illustrated in the following are for convenience of explanation, and the implementation of the present disclosure is not limited to these directions.

Figure 1:
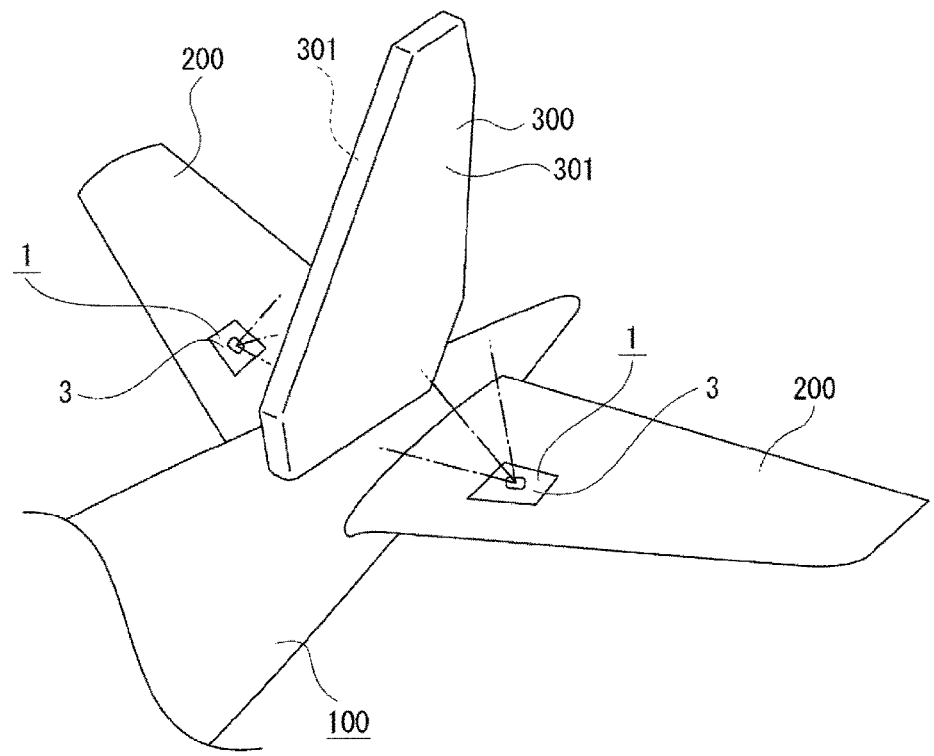
FIG. 1 illustrates a first embodiment of an aircraft lamp of the present disclosure together with FIGS. 2 to 6, and is a perspective view illustrating a part of an aircraft.

The aircraft lamp 1 is used as, for example, a logo lamp that is an external lighting, is attached to an airframe of an aircraft 100, for example, both horizontal tail wings 200 and 200 on the rear side, and has a function of illuminating a logo (not illustrated) drawn on a vertical tail wing 300 (see FIG. 1). Therefore, light emitted from the aircraft lamp 1 at one side is irradiated to one surface of the left and right surfaces of the vertical tail wing 300, and light emitted from the aircraft lamp 1 at the other side is irradiated to the other surface of the left and right surfaces of the vertical tail wing 300. The left and right surfaces of the vertical tail wing 300 become irradiated surfaces 301 and 301, respectively. An arrangement recess (not illustrated) opened upward is formed at the horizontal tail wing 200.

Figure 2:
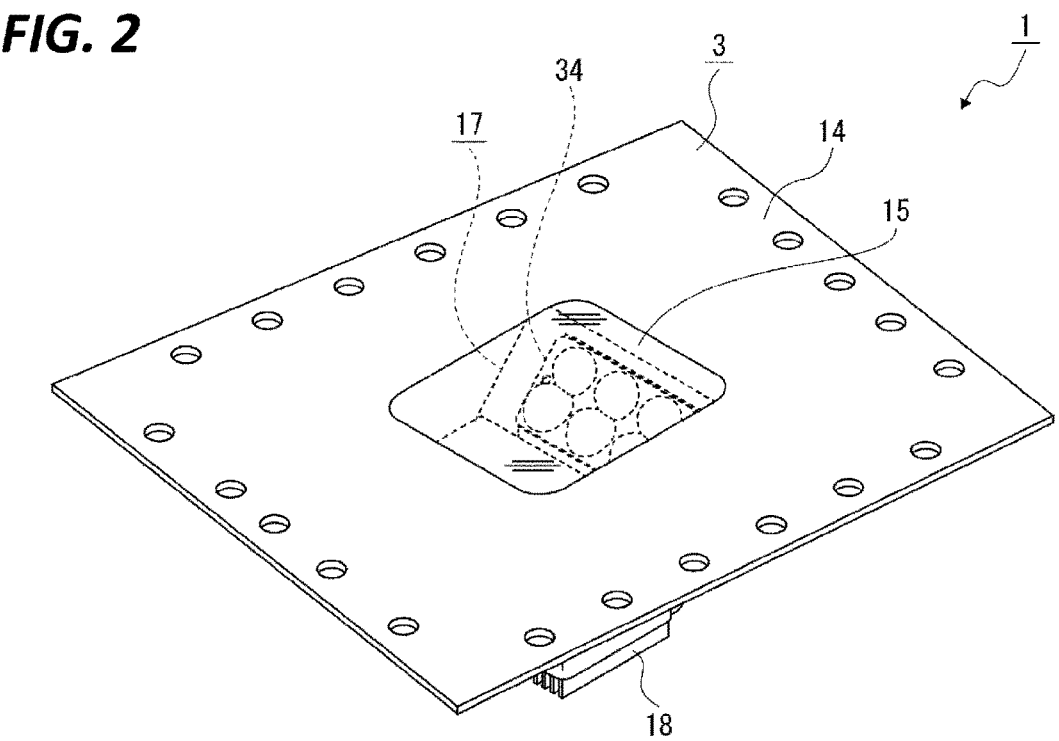
FIG. 2 is a perspective view of the aircraft lamp.
Figure 3:
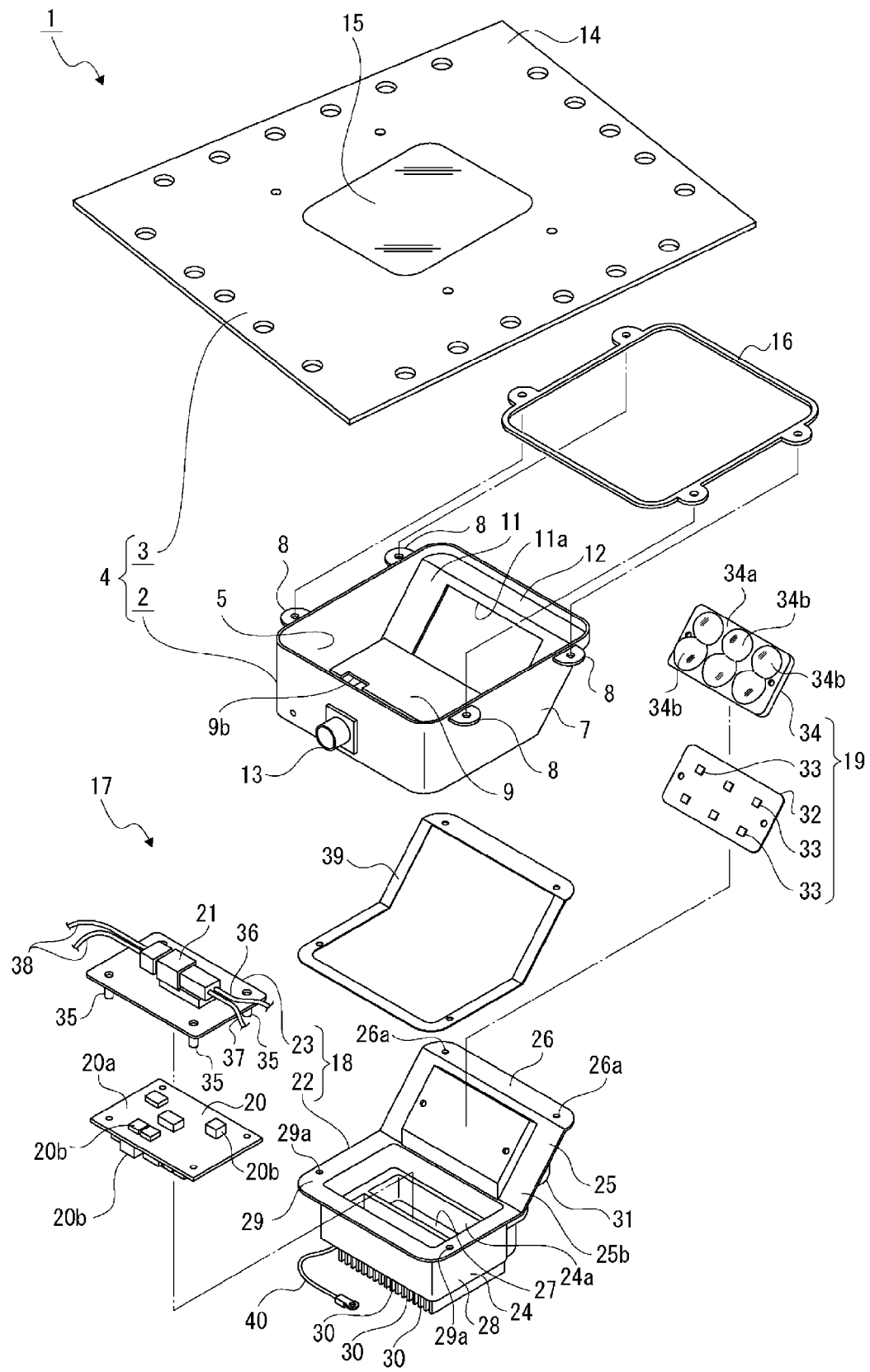
FIG. 3 is an exploded perspective view of the aircraft lamp.
Figure 4:
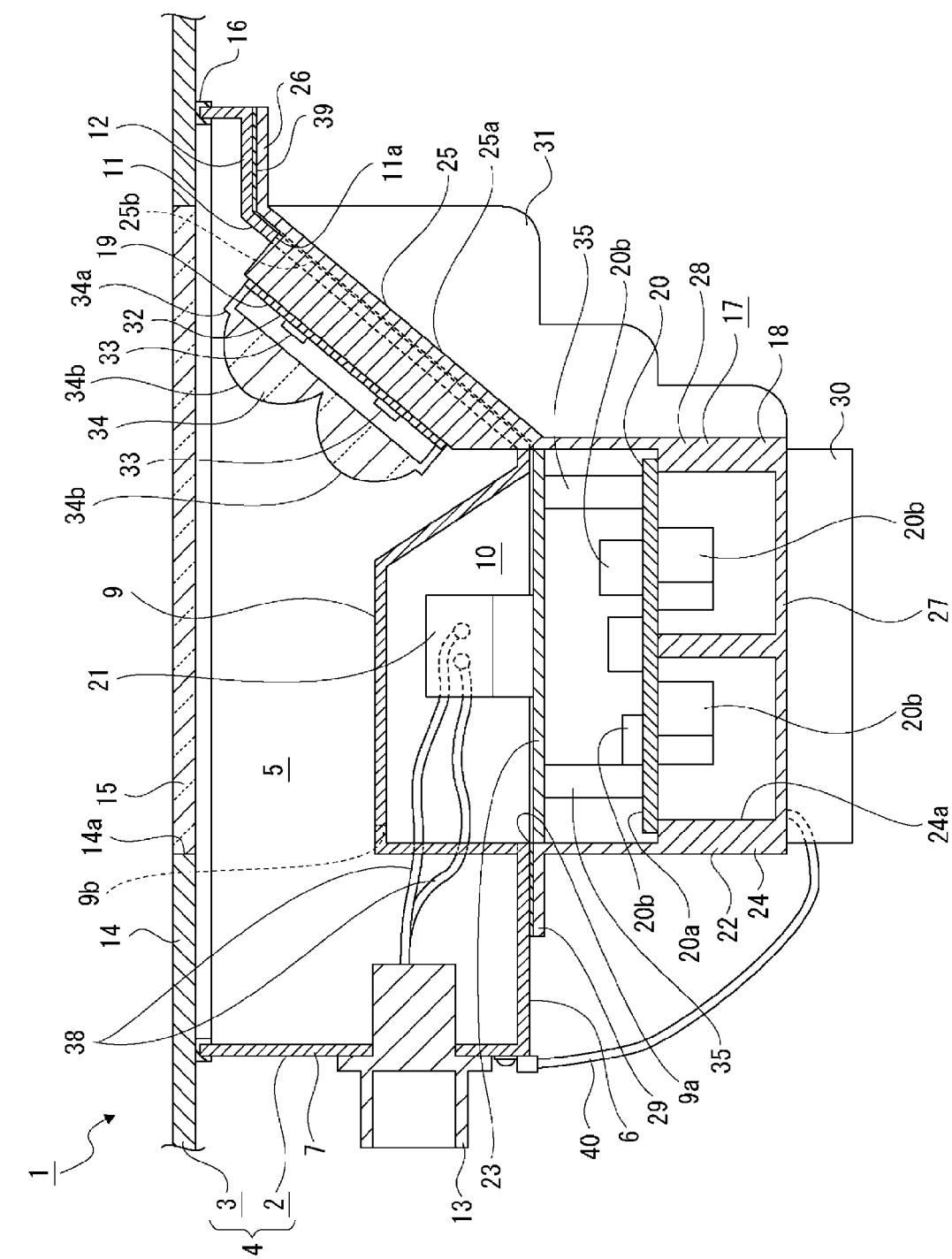
FIG. 4 is a cross-sectional view of the aircraft lamp.
Figure 5:
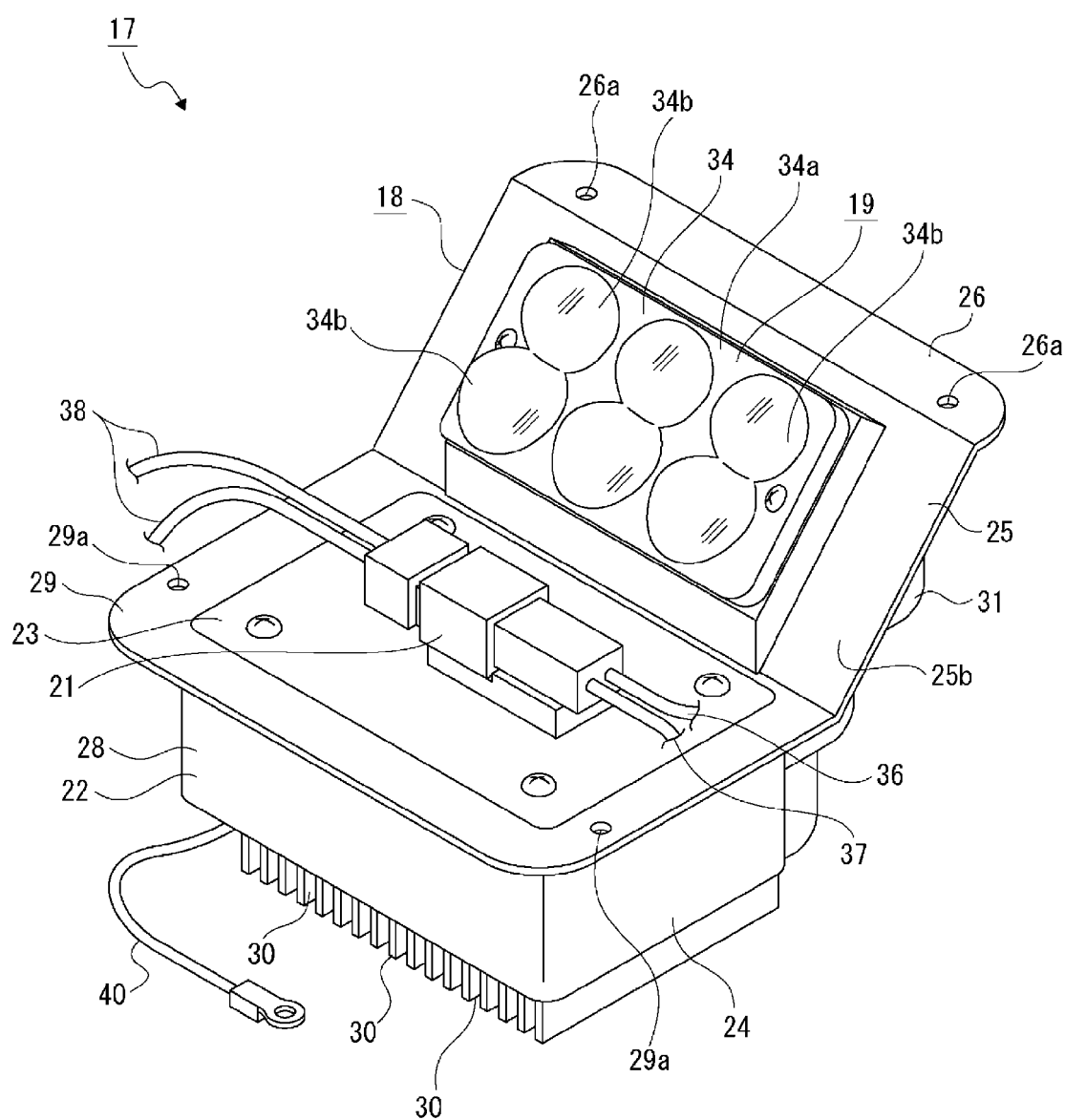
FIG. 5 is a perspective view of a lamp unit.
Figure 6:
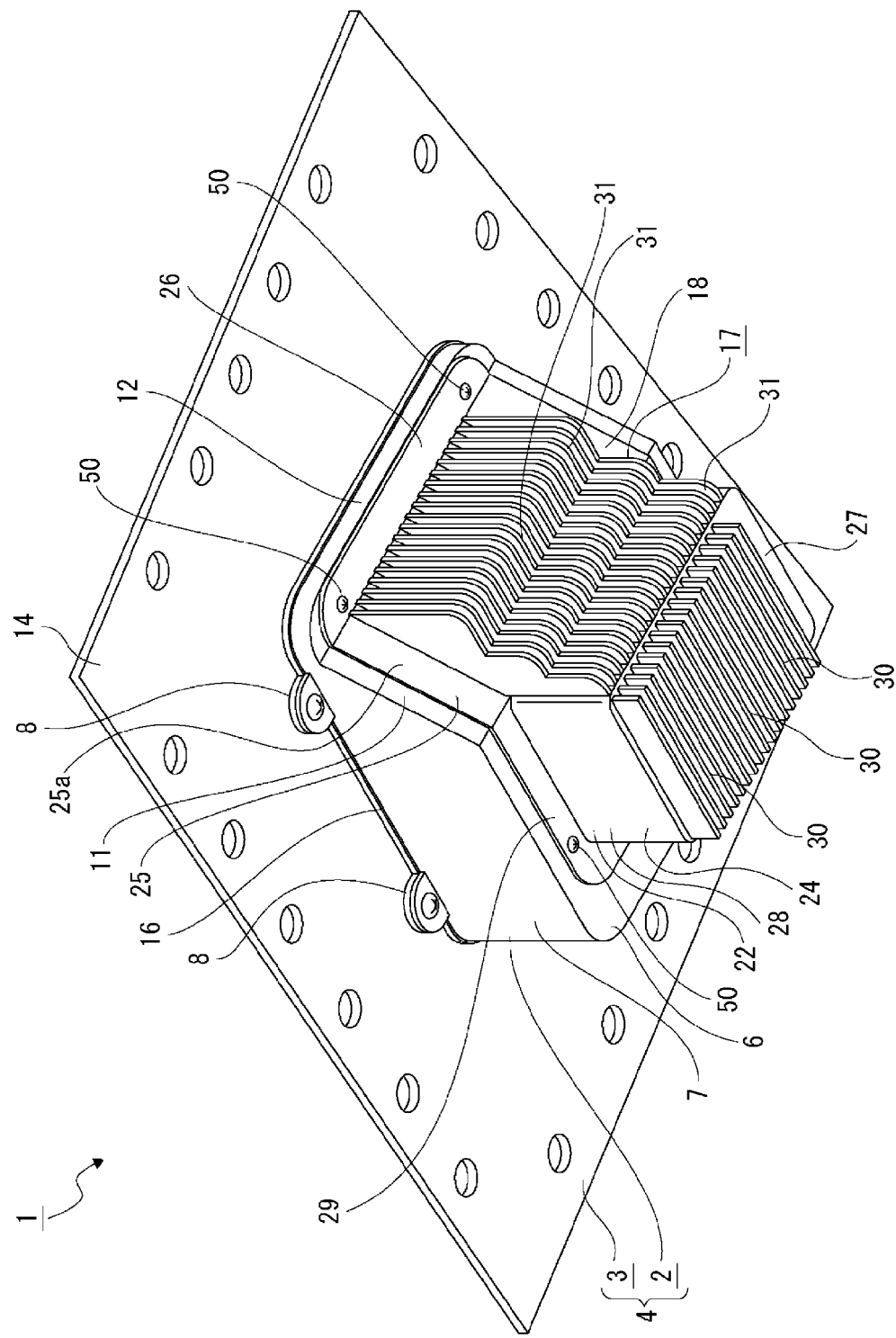
FIG. 6 is a perspective view illustrating the aircraft lamp when viewed from a direction different from that in FIG. 2.

The aircraft lamp 1 includes a lamp housing 2 having an opening at the upper end and a cover 3 attached to the lamp housing 2 in a state where the opening of the lamp housing 2 is closed (see FIGS. 2 to 4). A lamp outer housing 4 is configured by the lamp housing 2 and the cover 3, and an internal space of the lamp outer housing 4 is formed as a first arrangement space 5.

Each part of the lamp housing 2 is integrally formed of, for example, a metal material such as aluminum (see FIGS. 3 and 4). The lamp housing 2 includes a bottom surface portion 6 facing the vertical direction, a peripheral surface portion 7 protruding upward from a portion of the bottom surface portion 6 excluding a part of the outer peripheral portion, and attaching piece portions 8, 8, . . . protruding outward from the upper end portion of the peripheral surface portion 7.

The lamp housing 2 is provided with an arrangement case portion 9 protruding upward with respect to the bottom surface portion 6. The arrangement case portion 9 is formed in a box shape with a lower side opened, in which a lower side edge of one end portion in the left-right direction is continuous with an outer end portion edge of the bottom surface portion 6 in the left-right direction. The opening at the lower end of the arrangement case portion 9 is formed as an insertion/removal opening 9a. An inner space of the arrangement case portion 9 is formed as a second arrangement space 10. The arrangement case portion 9 includes a cable insertion hole 9b that communicates the first arrangement space 5 and the second arrangement space 10 with each other.

The lamp housing 2 is provided with a hole forming portion 11 having a lower end portion continuous with the bottom surface portion 6 and inclined with respect to the bottom surface portion 6. The hole forming portion 11 is inclined outward in the left-right direction as it goes upward, and is positioned outside the arrangement case portion 9 in the left-right direction. The hole forming portion 11 includes an insertion hole 11a that communicates the outside of the lamp housing 2 and the first arrangement space 5 with each other. The insertion hole 11a is formed, for example, in a substantially rectangular shape in a portion of the hole forming portion 11 excluding both the front and rear end portions and the upper end portion.

The lamp housing 2 is provided with an attaching surface portion 12 continuous with the upper end portion of the hole forming portion 11 and facing the vertical direction. The attaching surface portion 12 is positioned near the upper end of the peripheral surface portion 7.

A connector 13 is attached in the inner side portion of the peripheral surface portion 7 in the left-right direction in a state of being penetrated. The connector 13 has a portion positioned on the outer surface side of the peripheral surface portion 7 and a portion positioned on the inner surface side of the peripheral surface portion 7, and the portion positioned on the outer surface side of the peripheral surface portion 7 is connected to a power supply circuit (not illustrated) of the aircraft 100 via a connection cord (not illustrated).

The cover 3 is formed in a flat-plate shape, and includes a holding plate portion 14 made of a metal material and having a rectangular outer shape and a transmission cover portion 15 formed of a transparent material. The holding plate portion 14 includes an attaching hole 14a penetrated vertically, and the outer peripheral portion of the transmission cover portion 15 is attached to the opening edge of the attaching hole 14a.

The cover 3 is coupled to the attaching piece portions 8, 8, . . . of the lamp housing 2 by, for example, screwing via a gasket 16 having substantially the same size and shape as the upper end portion of the lamp housing 2. The gasket 16 is made of, for example, a silicon material, and has a function of securing airtightness between the lamp housing 2 and the cover 3.

The aircraft lamp 1 is arranged in the arrangement recess formed in the horizontal tail wing 200 by fixing the outer peripheral portion of the holding plate portion 14 of the cover 3 to the horizontal tail wing 200 by, for example, screwing, in a state where the cover 3 is attached to the lamp housing 2.

A lamp unit 17 is detachable with respect to the lamp housing 2 (see FIGS. 3 and 4). The lamp unit 17 includes an attaching base 18, a light source module 19, a control substrate 20, and a power receiving connector 21 (see FIGS. 3 to 6).

The attaching base 18 includes a body portion 22 made of a metal material such as aluminum, and a shielding cover portion 23 attached to the body portion 22.

The body portion 22 includes a substrate accommodation portion 24 formed in a box shape opened upward, an inclined surface portion 25 inclined with respect to the substrate accommodation portion 24, and an attached portion 26 continuous with the upper end portion of the inclined surface portion 25.

The substrate accommodation portion 24 includes a bottom wall portion 27 having a substantially flat-plate shape facing in the vertical direction, a peripheral wall portion 28 protruding upward from the outer peripheral portion of the bottom wall portion 27, and a flange portion 29 protruding outward from a portion of the peripheral wall portion 28 excluding a part of the upper end portion. The inside of the substrate accommodation portion 24 is formed as an arrangement recess 24a. The substrate accommodation portion 24 is provided with fin portions 30, 30, . . . protruding downward from the bottom wall portion 27 to be arranged in the front-rear direction. The flange portion 29 includes screw insertion holes 29a and 29a separated from each other in the front-rear direction.

The inclined surface portion 25 protrudes obliquely upward from the outer end portion of the substrate accommodation portion 24 in the left-right direction, and the lower end portion thereof is continuous with the upper end portion of the substrate accommodation portion 24. The inclined surface portion 25 is inclined in a state of being displaced outward in the left-right direction as it goes upward, and is inclined with respect to the cover 3 in a state where the lamp unit 17 is attached to the lamp housing 2. The inclined surface portion 25 is provided with heat radiation fins 31, 31, . . . protruding obliquely downward from one surface 25a facing obliquely downward to be arranged in the front-rear direction.

The attached portion 26 includes screw insertion holes 26a and 26a separated from each other in the front-rear direction.

The shielding cover portion 23 is made of, for example, a metal material in a flat-plate shape facing in the vertical direction. The shielding cover portion 23 is attached to the substrate accommodation portion 24 by, for example, screwing in a state where the arrangement recess 24a is closed from above.

The light source module 19 includes a substrate 32 on which a circuit pattern is formed, light sources 33, 33, . . . mounted on the substrate 32, and an inner lens 34 that controls light emitted from the light sources 33, 33, . . . .

The substrate 32 is arranged on the other surface 25b of the inclined surface portion 25 of the attaching base 18 via a heat radiation sheet (not illustrated), and is attached to the inclined surface portion 25 together with the inner lens 34 by, for example, screwing. Therefore, heat generated in the substrate 32 and the light sources 33, 33, . . . is mainly transferred from the heat radiation sheet to the inclined surface portion 25, and is released from the heat radiation fins 31, 31, . . . to the outside.

In this manner, since the heat generated in the substrate 32 and the light sources 33, 33, . . . is transferred to the inclined surface portion 25 by the heat radiation sheet, the temperature rise of the substrate 32 and the light sources 33, 33, . . . is suppressed, and a good driving state of the substrate 32 and the light sources 33, 33, . . . may be secured.

As a light source 33, for example, a light emitting diode (LED) is used. The light sources 33, 33, . . . are regularly mounted on the substrate 32, and, for example, are mounted in a state of being separated at equal intervals in the front-rear and left-right directions.

The inner lens 34 is made of transparent resin or glass, and includes a base surface portion 34a having a flat-plate shape, and control lens portions 34b, 34b, having a substantially hemispherical shape protruding upward from the base surface portion 34a, respectively. The control lens portions 34b, 34b, . . . are provided at positions corresponding to the light sources 33, 33, . . . in the same number as the light sources 33, 33, . . . . The control lens portions 34b, 34b, . . . are, for example, convex lenses having a free curved surface, and have a function of controlling to condense light emitted from the light sources 33, 33, . . . and irradiating the light.

The inner lens 34 is arranged in a state where the base surface portion 34a and the control lens portions 34b, 34b, . . . cover the substrate 32 and the light sources 33, 33, . . . from above, and is attached to the inclined surface portion 25 by, for example, screwing. Therefore, the substrate 32, the light sources 33, 33, . . . , and the inner lens 34 are arranged on the inclined surface portion 25.

As described above, since the substrate 32 on which the light sources 33, 33, . . . are mounted is arranged on the inclined surface portion 25, the light emitted from the light sources 33, 33, . . . is irradiated from the light source module 19 toward an upper side oblique side direction.

Further, as described above, since the substrate 32 and the inner lens 34 are attached to the attaching base 18 by, for example, screwing, the light source module 19 is detachable with respect to the attaching base 18.

Therefore, it is possible to exchange the light source module 19 according to a model of the aircraft 100, and by attaching the light source module 19 according to the different model aircraft 100 to the attaching base 18, it is possible to irradiate light according to the different model aircraft 100, and thus, the versatility of the aircraft lamp 1 may be improved.

The control substrate 20 has a function of controlling the ON/OFF of the light sources 33, 33, . . . of the light source module 19, and includes a base substrate 20a facing the vertical direction, and electronic parts 20b, 20b, . . . mounted on both the upper and lower surfaces of the base substrate 20a. The control substrate 20 is attached to the shielding cover portion 23 via spacers 35, 35, . . . by, for example, screwing.

The control substrate 20 is positioned below the shielding cover portion 23. Therefore, in a state where the shielding cover portion 23 is attached to the substrate accommodation portion 24, the control substrate 20 is arranged and accommodated in the arrangement recess 24a of the substrate accommodation portion 24 in a state of being covered from above by the shielding cover portion 23.

In this manner, in the state where the shielding cover portion 23 is attached to the substrate accommodation portion 24, the control substrate 20 is covered from directions except above by each of the surface portions of the substrate accommodation portion 24 and is covered from above by the shielding cover portion 23.

Therefore, the control substrate 20 is accommodated inside the substrate accommodation portion 24, and is covered by the substrate accommodation portion 24 and the shielding cover portion 23, so that noise generated in the control substrate 20 is shielded by the substrate accommodation portion 24 and the shielding cover portion 23.

A part of the control substrate 20 is brought into contact with a part of the substrate accommodation portion 24 via a heat transfer sheet (not illustrated). Therefore, the heat generated in the control substrate 20 is mainly transferred from the heat transfer sheet to the substrate accommodation portion 24, and the heat transferred to the substrate accommodation portion 24 is released from the fin portions 30, 30, . . . to the outside.

In this manner, since the heat generated in the control substrate 20 is transferred to the substrate accommodation portion 24 by the heat transfer sheet, the temperature rise of the control substrate 20 is suppressed, and a good driving state of the control substrate 20 may be secured.

The power receiving connector 21 is formed in, for example, a shape extending in the front-rear direction, and is attached to the upper surface of the shielding cover portion 23. One end of each of a first connection line 36 and a second connection line 37 is connected to the power receiving connector 21, the other end of the first connection line 36 is connected to the substrate 32, and the other end of the second connection line 37 is connected to the control substrate 20. One end of a third connection line 38 is connected to the power receiving connector 21, and the other end of the third connection line 38 is connected to the connector 13.

Therefore, the light sources 33, 33, . . . are connected to the power supply circuit via the substrate 32, the first connection line 36, the power receiving connector 21, the third connection line 38, and the connector 13. Further, the control substrate 20 is connected to the power supply circuit via the second connection line 37, the power receiving connector 21, the third connection line 38, and the connector 13.

The lamp unit 17 configured as described above is attached to the lamp housing 2 from below by attaching screws 50, 50, . . . (see FIGS. 4 and 6). The attaching screws 50, 50, . . . are inserted to the screw insertion holes 26a and 26a, and 29a and 29a formed in the attaching base 18 from below, and are screwed to the bottom surface portion 6 and the attaching surface portion 12 of the lamp housing 2. Therefore, in a state where the lamp unit 17 is attached to the lamp housing 2, the substrate accommodation portion 24 of the body portion 22 and the shielding cover portion 23 are positioned on the lower side of the bottom surface portion 6, the inclined surface portion 25 of the body portion 22 is positioned on the lower side of the hole forming portion 11, the light source module 19 is inserted to the insertion hole 11a and is arranged in the first arrangement space 5, and the attached portion 26 of the body portion 22 is positioned on the lower side of the attaching surface portion 12.

At this time, the power receiving connector 21 is arranged in the second arrangement space 10 formed in the arrangement case portion 9 of the lamp housing 2 via the insertion/removal opening 9a. Therefore, the third connection line 38 is inserted to the cable insertion hole 9b of the arrangement case portion 9, and connects the power receiving connector 21 and the connector 13 with each other.

When the lamp unit 17 is attached to the lamp housing 2 from below, an annular heat transfer sheet 39 is arranged on the outer peripheral portion of the attaching base 18 (see FIGS. 3 and 4). Therefore, in the lamp unit 17, the attaching base 18 is pressed against the lamp housing 2 from below via the heat transfer sheet 39.

The heat transfer sheet 39 is formed in a shape corresponding to the outer peripheral portion of the upper surface of the attaching base 18, and is arranged at a position over the substrate accommodation portion 24, the inclined surface portion 25, and the attached portion 26.

In this manner, since the outer peripheral portion of the attaching base 18 is pressed against the lamp housing 2 via the annular heat transfer sheet 39 in the state where the lamp unit 17 is attached to the lamp housing 2, the heat generated in the lamp unit 17 is released from the attaching base 18 to the outside, and transferred to the lamp housing 2 via the heat transfer sheet 39 so as to be also released from the lamp housing 2 to the outside. Therefore, it is possible to efficiently suppress the temperature rise of each part of the lamp unit 17.

Further, since the lamp unit 17 and the lamp housing 2 are brought into close contact with each other via the heat transfer sheet 39, waterproof performance of the lamp unit 17 may be improved.

The lamp housing 2 and the lamp unit 17 are coupled with each other by a dropout prevention wire 40. Both end portions of the dropout prevention wire 40 are attached to the outer surface of the lamp housing 2 and the outer surface of the lamp unit 17 by, for example, screwing. For example, both end portions are attached to the lower surface of the bottom surface portion 6 or the outer peripheral surface of the peripheral surface portion 7 of the lamp housing 2 and the lower surface or the outer peripheral surface of the substrate accommodation portion 24 of the lamp unit 17.

In the aircraft lamp 1, the lamp unit 17 is detachable with respect to the lamp housing 2, and the lamp unit 17 may be separated from the lamp housing 2 by releasing the screwed state of the attaching screws 50, 50, . . . with respect to the lamp housing 2. However, even in a state where the lamp unit 17 is separated from the lamp housing 2, the lamp housing 2 and the lamp unit 17 are connected with each other by the dropout prevention wire 40.

Therefore, the dropout prevention wire 40 prevents the lamp unit 17 from falling when the lamp unit 17 is separated from the lamp housing 2, and thus, may prevent the lamp unit 17 from being broken or being damaged.

Further, since the dropout prevention wire 40 is positioned on the outer surface side of the lamp housing 2 and the lamp unit 17, the power receiving connector 21 and the dropout prevention wire 40 do not interfere with each other, and when the first connection line 36, the second connection line 37, and the third connection line 38 are connected to the power receiving connector 21, the dropout prevention wire 40 does not hinder the connection, and thus, it is possible to improve workability in the connection work.

Further, in the aircraft lamp 1, it may be configured such that, by attaching, for example, a washer (not illustrated) made of, for example, silicon to the screw shaft portion of the attaching screw 50, when the lamp unit 17 is separated from the lamp housing 2, the attaching screw 50 does not fall from the lamp unit 17 by the washer.

In the aircraft lamp 1 configured as described above, when light is emitted from the light sources 33, 33, . . . , the emitted light is controlled by each of the control lens portions 34b, 34b, . . . of the inner lens 34 so as to be irradiated to the irradiated surface 301 of the vertical tail wing 300 on which a logo is drawn.

As described above, in the aircraft lamp 1, the lamp housing 2 includes the insertion hole 11a that communicates with the first arrangement space 5, the lamp housing 2 is provided with the arrangement case portion 9 having the second arrangement space 10 opened on the outer surface side of the lamp housing 2, at least a part of the light module 19 is arranged in the first arrangement space 5 in a state of being inserted to the insertion hole 11a, and the power receiving connector 21 is arranged in the second arrangement space 10.

Therefore, the lamp unit 17 including the light source module 19, the attaching base 18, and the power receiving connector 21 is detachable with respect to the lamp housing 2 from the outer surface side of the lamp housing 2. Therefore, it is possible to separate the lamp unit 17 from the lamp housing 2 without separating the lamp housing 2 or the cover 3 from the aircraft 100, and thus, the maintainability with respect to the lamp unit 17 may be improved, and a good lighting state of the light emitted from the lamp unit 17 may be secured.

Further, the attaching base 18 is provided with the substrate accommodation portion 24 having the arrangement recess 24a and the shielding cover portion 23 that closes the arrangement recess 24a. In the arrangement recess 24a, the control substrate 20 that controls an ON/OFF of the light source 33 is arranged, and the power receiving connector 21 is attached to the surface of the shielding cover portion 23 opposite to the arrangement recess 24a.

Therefore, since the power receiving connector 21 and the control substrate 20 are oppositely positioned across the shielding cover portion 23, the power receiving connector 21 and the control substrate 20 do not interfere with each other, and when the first connection line 36, the second connection line 37, and the third connection line 38 are connected to the power receiving connector 21, the control substrate 20 does not hinder the connection. Therefore, it is possible to improve workability in the connection work, and to miniaturize by improving space efficiency.

Further, since the control substrate 20 is shielded by the shielding cover portion 23 in a state where the control substrate 20 is arranged in the arrangement recess 24a, the influence of the noise generated in the control substrate 20 on each device or each instrument provided in the aircraft 100 may be suppressed.

Further, the attaching base 18 is provided with the inclined surface portion 25 inclined with respect to the cover 3, and the heat radiation fins 31, 31, . . . protruding from one surface 25a of the inclined surface portion 25 in the thickness direction, and the light source module 19 includes the substrate 32 on which a plurality of the light sources 33 is mounted, and is attached to the other surface 25b of the inclined surface portion 25 in the thickness direction.

Therefore, the substrate 32 and the light sources 33, 33, . . . are arranged in a state of being inclined with respect to the cover 3, and the heat radiation fins 31, 31, . . . protrude from the inclined surface portion 25 to which the substrate 32 is attached. Therefore, the light emitted from the light sources 33, 33, . . . may be easily irradiated in a direction oblique to the cover 3, and the heat generated in the substrate 32 and the light sources 33, 33, . . . may be efficiently transferred to the heat radiation fins 31, 31, . . . .

In the above, the example in which one light source module 19 is provided in the lamp unit 17 is illustrated. However, the number of the light source module 19 provided in the aircraft lamp 1 is not limited to one, but may be a plurality.

Aircraft Lamp According to Second Embodiment

Subsequently, an aircraft lamp 51 according to a second embodiment will be described.

In the following, an example in which the aircraft lamp 51 according to the present disclosure is applied to an ice-inspection lamp which is an external lighting and is attached to an airframe is illustrated. However, the scope of application of the present disclosure is not limited to an ice-inspection lamp, but may be applied to other external lighting such as a logo lamp used in an aircraft.

The aircraft lamp 51 is attached to, for example, the left and right side surface portions of the airframe, and a lamp outer housing is configured by a lamp housing and a cover. In the following descriptions, front-rear, upward-downward, and left-right directions are illustrated by setting a coupling direction of the lamp housing and the cover to a left-right direction, the cover side as an outer side in the side direction, and the lamp housing side as an inner side in the side direction.

The front-rear, upward-downward, and left-right directions illustrated in the following are for convenience of explanation, and the implementation of the present disclosure is not limited to these directions.

Figure 7:
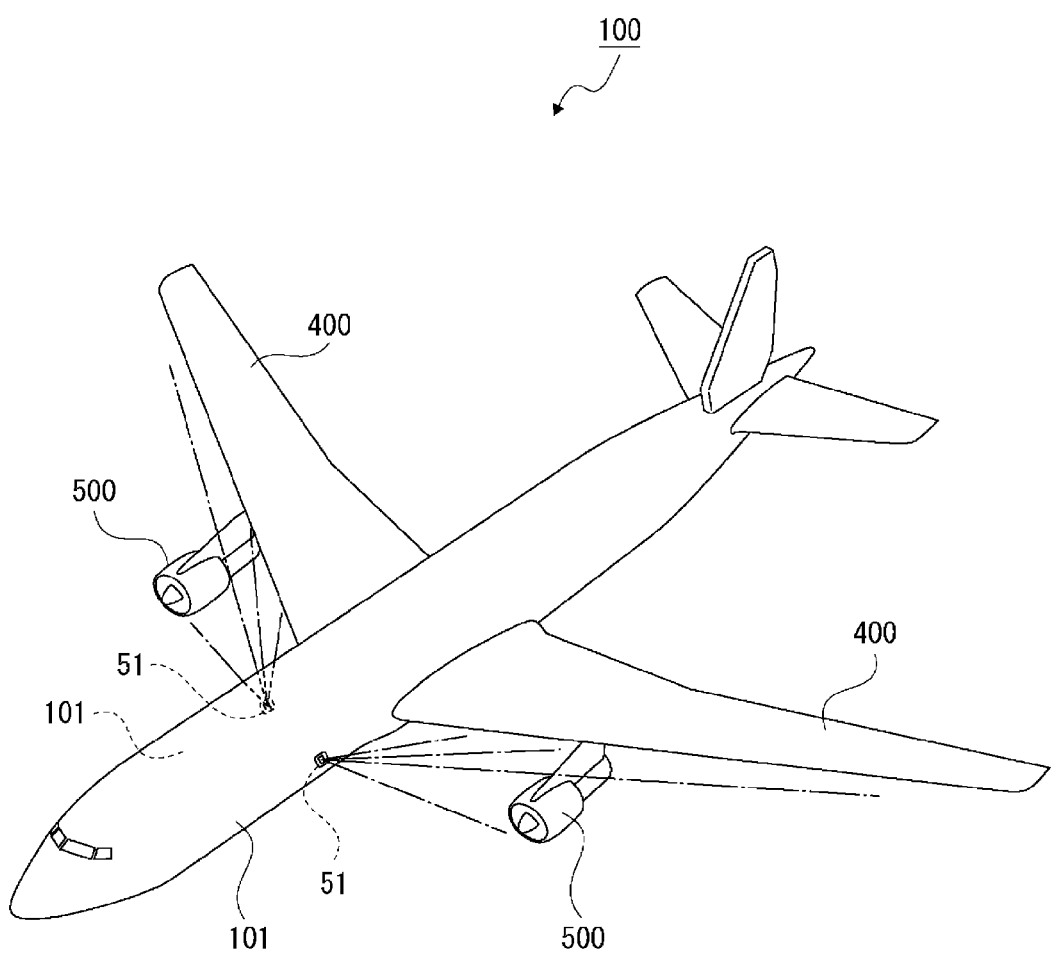
FIG. 7 illustrates a second embodiment of an aircraft lamp of the present disclosure together with FIGS. 8 to 11, and is a perspective view illustrating an aircraft.

The aircraft lamp 51 is used as, for example, an ice-inspection lamp, which is an external lighting, and is attached to left and right side surface portions 101 and 101 of the airframe of the aircraft 100, respectively (see FIG. 7). The aircraft lamp 51 is used to illuminate main wings 400 and 400 and engines 500 and 500 attached to the main wings 400 and 400, respectively, to inspect adhesion of snow or ice to the engines 500 and 500 or portions around the engines 500 and 500.

In the side surface portion 101, an arrangement recess (not illustrated) opened on the outer side in the side direction.

Figure 8:
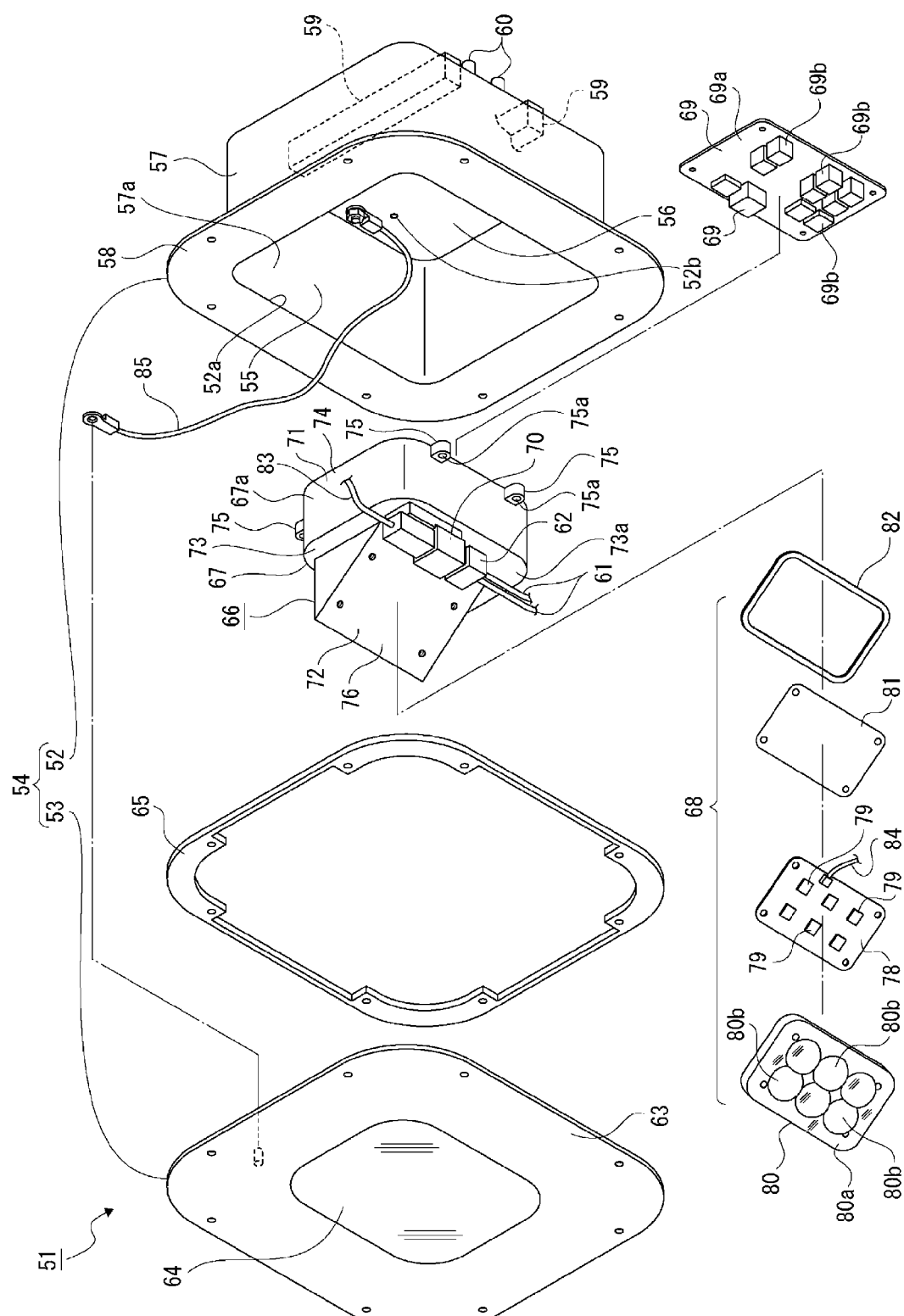
FIG. 8 is an exploded perspective view of the aircraft lamp.
Figure 9:
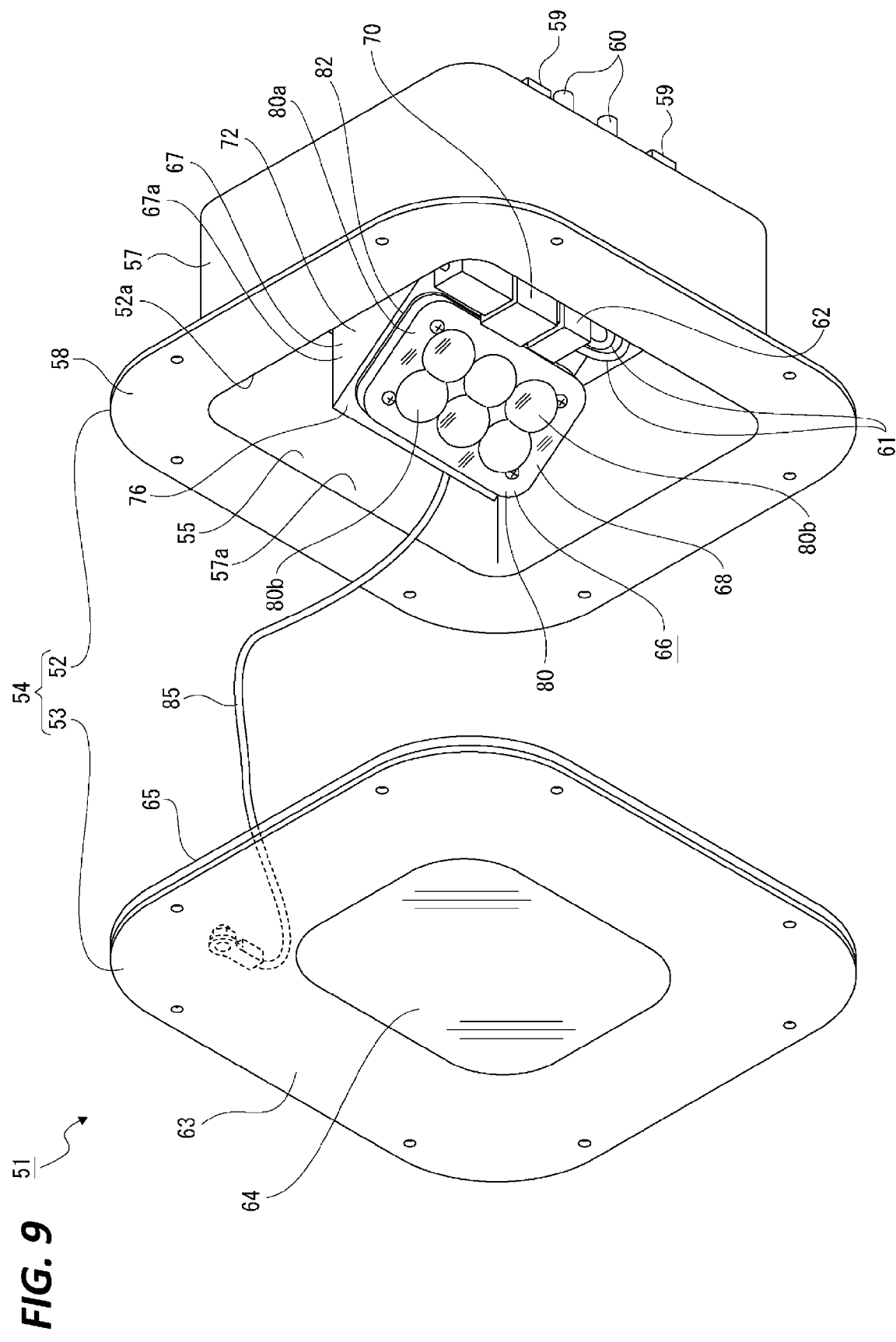
FIG. 9 is a perspective view illustrating the aircraft lamp in a state where a cover is separated.
Figure 10:
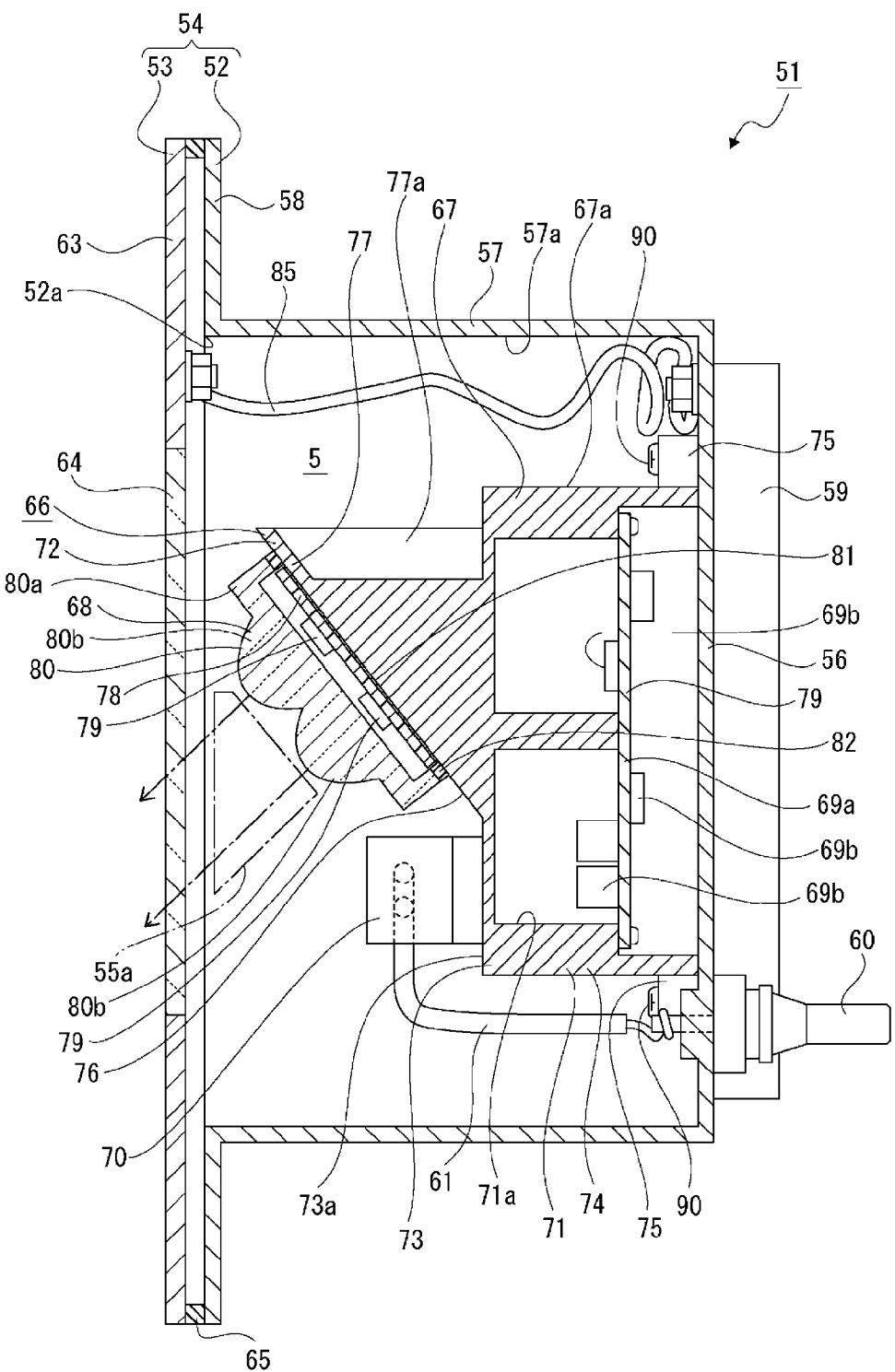
FIG. 10 is a cross-sectional view of the aircraft lamp.
Figure 11:
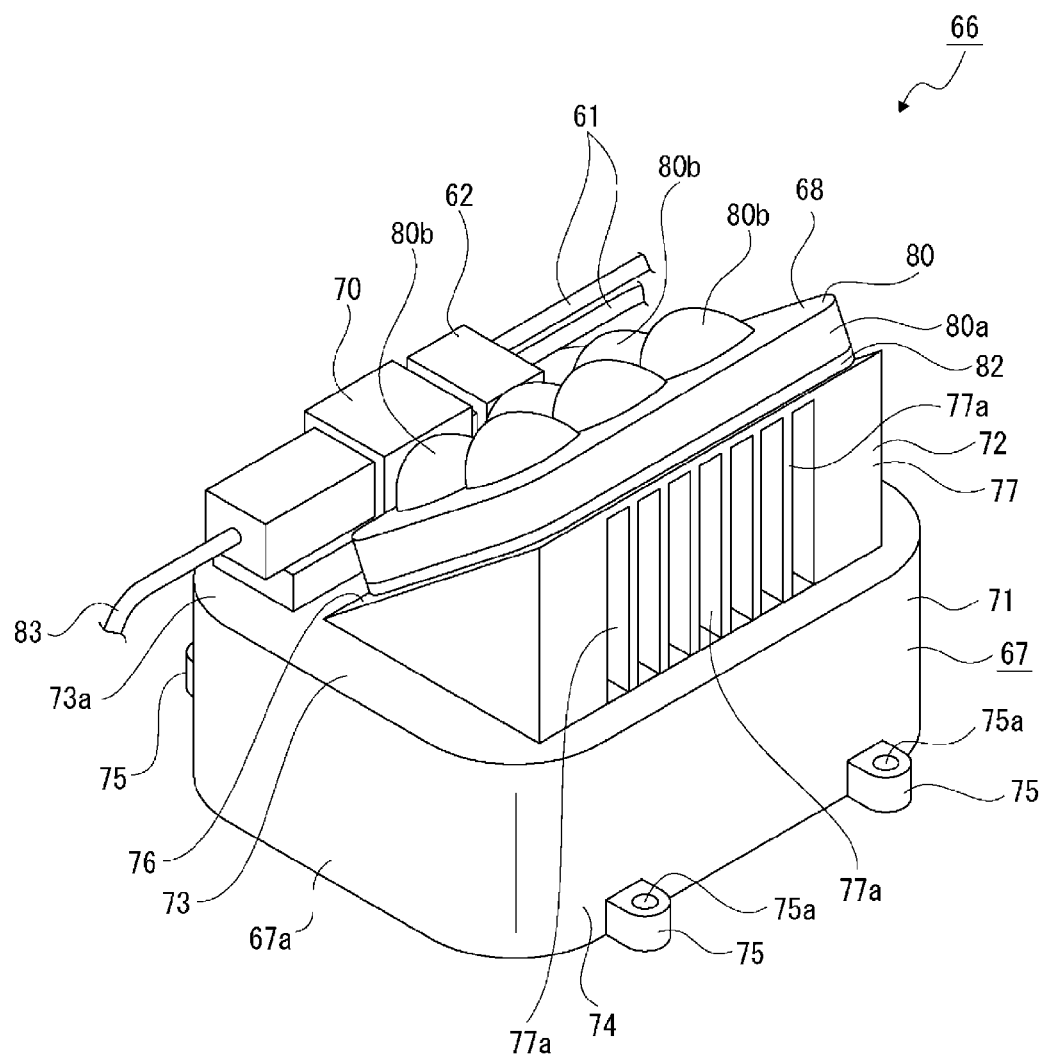
FIG. 11 is a perspective view of a lamp unit.

The aircraft lamp 51 includes a lamp housing 52 and a cover 53, the outer end portion of the lamp housing 52 in the side direction is formed as an opening 52a, and the opening 52a is closed by the cover 53 (see FIGS. 8 to 10). A lamp outer housing 54 is configured by the lamp housing 52 and the cover 53, and an internal space of the lamp outer housing 54 is formed as an arrangement space 55.

Each part of the lamp housing 52 is integrally formed of, for example, a metal material such as aluminum. The lamp housing 52 includes a bottom surface portion 56 facing the left-right direction, a peripheral surface portion 57 protruding outward in the side direction from the outer peripheral portion of the bottom surface portion 56, and a flange portion 58 protruding from the tip end portion of the peripheral surface portion 57.

The lamp housing 52 is provided with fastening projection portions 59 and 59 protruding inward in the side direction from the bottom surface portion 56 to be separated from each other in the vertical direction. The fastening projection portions 59 and 59 are formed in a shape extending in the front-rear direction. The inner surface of the peripheral surface portion 57 is formed as an inner peripheral surface 57a of the lamp housing 52.

The lamp housing 52 includes screw holes 52b, 52b, . . . opened on the bottom surface portion 56 in a portion from the bottom surface portion 56 to the fastening projection portions 59 and 59, and two of the screw holes 52b, 52b, . . . are formed at positions corresponding to the fastening projection portions 59 and 59, respectively, to be separated in the left-right direction.

In the bottom surface portion 56, a power supply terminal 60 is attached in a penetrated state between the fastening projection portions 59 and 59. The power supply terminal 60 has portions positioned inside and outside the lamp housing 52, and the portion positioned outside the lamp housing 52 is connected to a power supply circuit (not illustrated) of the aircraft 100 via a connection cord (not illustrated).

The portion of the power supply terminal 60 positioned inside the lamp housing 52 is connected with one end portion of a power supply cord 61. The other end portion of the power supply cord 61 is connected to a connection connector 62.

The cover 53 includes a retainer 63 formed in an annular shape by a metal material such as aluminum, and a transmission cover portion 64 with an outer peripheral portion fixed to an inner peripheral portion of the retainer 63. The cover 53 is coupled to the flange portion 58 of the lamp housing 52 by, for example, screwing via a gasket 65 having substantially the same size and shape as the outer peripheral portion of the retainer 63. The gasket 65 is made of, for example, a silicon material, and has a function of securing airtightness between the lamp housing 52 and the cover 53.

The aircraft lamp 51 is arranged in the arrangement recess formed in the side surface portion 101 by fixing the retainer 63 and the flange portion 58 to the side surface portion 101 of the aircraft 100 in a state where the cover 53 is coupled to the flange portion 58.

A lamp unit 66 is detachable with respect to the lamp housing 52. The lamp unit 66 includes an attaching base 67, a light source module 68, a control substrate 69, and a power receiving connector 70 (see FIGS. 8 to 11).

The attaching base 67 is made of a metal material such as aluminum, and includes a substrate accommodation portion 71 formed in a box shape opened in the side direction, and a module attaching portion 72 protruding in a side direction from the substrate accommodation portion 71.

The substrate accommodation portion 71 includes a base portion 73 having a flat-plate shape facing in the left-right direction, and a peripheral wall portion 74 protruding inward in the side direction from the outer peripheral portion of the base portion 73. The inside of the substrate accommodation portion 71 is formed as an arrangement recess 71a. The module attaching portion 72 protrudes from the base portion 73 excluding a part thereof, and a portion of the base portion 73 on the rear side of the module attaching portion 72 is provided as a connector attaching plate portion 73a.

The attaching base 67 is provided with attached piece portions 75, 75, . . . protruding from the inner end portion of the peripheral wall portion 74 in the side direction to the outer surface side, respectively. The attached piece portion 74 includes a screw insertion hole 75a penetrated in the left-right direction.

The module attaching portion 72 is formed in a substantially triangular columnar shape, which protrudes outward in the side direction from the base portion 73, and has a width in the front-rear direction that is decreased as it goes outward in the side direction. The module attaching portion 72 includes an attaching portion 76 inclined in the rear side oblique side direction. The module attaching portion 72 is provided with a fin forming portion 77 having a substantially rectangular shape continuous with an outer end portion edge of the attaching portion 76 in the side direction, and the fin forming portion 77 is provided with heat radiation fins 77a, 77a, . . . separated from each other in the vertical direction (see FIG. 11). An outer surface of the fin forming portion 77 is a surface facing toward.

In the attaching base 67, an outer peripheral surface 67a is configured by the outer surface of the peripheral wall portion 74 and the outer surface of the fin forming portion 77. In a state where the lamp unit 66 is arranged in the arrangement space 55, the outer peripheral surface 67a is positioned to face the inner peripheral surface 57a of the lamp housing 52.

The light source module 68 includes a substrate 78 on which a circuit pattern is formed, light sources 79, 79, . . . mounted on the substrate 78, and an inner lens 80 that controls light emitted from the light sources 79, 79, . . . (see FIGS. 8 to 11).

For example, a light emitting diode (LED) is used as the light source 79. The light sources 79, 79, . . . are, for example, regularly mounted on the substrate 78.

The inner lens 80 is made of transparent resin or glass, and includes a base surface portion 80a having a flat-plate shape, and control lens portions 80b, 80b, having a substantially hemispherical shape protruding from the base surface portion 34a to the side opposite to the substrate 78, respectively. The control lens portions 80b, 80b, . . . are provided at positions corresponding to the light sources 79, 79, . . . in the same number as the light sources 79, 79, . . . . The control lens portions 80b, 80b, . . . are, for example, convex lenses having a free curved surface, and have a function of controlling to condense light emitted from the light sources 79, 79, . . . and irradiating the light.

The substrate 78 is arranged on the attaching portion 76 of the attaching base 67 via a heat radiation sheet 81, and the inner lens 80 is arranged on the attaching portion 76 via a packing 82. The packing 82 is formed in an annular shape much larger than the substrate 78 and the heat radiation sheet 81, and is positioned between the outer peripheral portion of the base surface portion 80a and the attaching portion 76.

The inner lens 80 is arranged in a state where the base surface portion 80a and the control lens portions 80b, 80b, . . . cover the substrate 78 and the light sources 79, 79, . . . from the outside, and is attached to the attaching portion 76 together with the substrate 78 by, for example, screwing. Heat generated in the substrate 78 and the light sources 79, 79, . . . is mainly transferred from the heat radiation sheet 81 to the attaching portion 76, and is released from the heat radiation fins 77a, 77a, . . . to the outside.

In this manner, since the heat generated in the substrate 78 and the light sources 79, 79, . . . is transferred to the attaching portion 76 by the heat radiation sheet 81, the temperature rise of the substrate 78 and the light sources 79, 79, . . . is suppressed, and a good driving state of the substrate 78 and the light sources 79, 79, . . . may be secured.

As described above, since the substrate 78 on which the light sources 79, 79, . . . are mounted is arranged on the attaching portion 76 inclined to the rear side oblique side direction, the light emitted from the light sources 79, 79, . . . is irradiated from the light source module 68 toward the rear side oblique side direction.

Further, as described above, since the substrate 78 and the inner lens 80 are attached to the attaching base 67 by, for example, screwing, the light source module 68 is detachable with respect to the attaching base 67.

Therefore, it is possible to exchange the light source module 68 according to a model of the aircraft 100, and by attaching the light source module 68 according to the different model aircraft 100 to the attaching base 67, it is possible to irradiate light according to the different model aircraft 100, and thus, the versatility of the aircraft lamp 51 may be improved.

The control substrate 69 has a function of controlling the ON/OFF of the light sources 79, 79, . . . of the light source module 68, and includes a base substrate 69a facing the front-rear direction, and electronic parts 69b, 69b, . . . mounted on both the left and right surfaces of the base substrate 69a. The control substrate 69 is arranged in the arrangement recess 71a, and is attached to the substrate accommodation portion 71 by, for example, screwing in a state of being accommodated in the substrate accommodation portion 71.

A part of the control substrate 69 is brought into contact with a part of the substrate accommodation portion 71 via a heat transfer sheet (not illustrated). Therefore, the heat generated in the control substrate 69 is mainly transferred from the heat transfer sheet to the module attaching portion 72 through the substrate accommodation portion 71, and then, released from the heat radiation fins 77a, 77a, . . . to the outside.

In this manner, since the heat generated in the control substrate 69 is released from the heat radiation fins 77a, 77a, . . . by the heat transfer sheet, the temperature rise of the control substrate 69 is suppressed, and a good driving state of the control substrate 69 may be secured.

Further, as described above, the control substrate 69 is attached to the attaching base 67 by, for example, screwing, thereby being detachable with respect to the attaching base 67.

Therefore, it is possible to exchange the control substrate 69 according to a model of the aircraft 100, and by attaching the control substrate 69 according to the different model aircraft 100 to the attaching base 67, it is possible to irradiate light according to the different model aircraft 100, and thus, the versatility of the aircraft lamp 51 may be improved.

The power receiving connector 70 is formed in, for example, a shape extending in the vertical direction, and is attached to the connector attaching plate portion 73a of the attaching base 67. The connection connector 62 is detachable in the vertical direction with respect to the power receiving connector 70. The detachment direction of the connection connector 62 with respect to the power receiving connector 70 is the vertical direction, and is a direction that moves along the light source module 68.

Therefore, since the connection connector 62 is detached with respect to the power receiving connector 70 by being moved along the light source module 68, the connection connector 62 does not interfere with the light source module 68 in the detachment work of the connection connector 62 with respect to the power receiving connector 70. Therefore, it is possible to improve the workability in the detachment work of the connection connector 62 with respect to the power receiving connector 79 and to prevent the connection connector 62 and the light source module 68 from being damaged.

One end of a first connection line 83 is connected to the power receiving connector 70, and the other end of the first connection line 83 is connected to the control substrate 69.

Further, the control substrate 69 and the substrate 78 of the light source module 68 are connected with each other by a second connection line 84.

Therefore, the light sources 79, 79, . . . are connected to the power supply circuit via the substrate 78, the second connection line 84, the control substrate 69, the first connection line 83, the power receiving connector 70, the connection connector 62, the power supply cord 61, and the power supply terminal 60.

In the lamp unit 66, the light source module 68 is positioned on the side of the control substrate 69, and the light source module 68 and the control substrate 69 are positioned on the left and right. Therefore, the space for arranging the light source module 68 and the control substrate 69 in the vertical direction and the front-rear direction of the lamp unit 66 may be small, and thus, the lamp unit 66 may be miniaturized.

The lamp unit 66 configured as described above is attached to the lamp housing 52 from the opening 52a by attaching screws 90, 90, . . . in a state where the cover 53 is separated from the lamp housing 52 (see FIGS. 8 to 10). The attaching screws 90, 90, . . . are inserted to the screw insertion holes 75a, 75a, . . . formed in the attached piece portions 75, 75, . . . of the attaching base 67, and are screwed to the screw holes 52b, 52b, . . . formed through the bottom surface portion 56 of the lamp housing 52 and the fastening projection portions 59 and 59 so as to be attached to the lamp housing 52.

In a state where the lamp unit 66 is attached to the lamp housing 52, the control substrate 69 accommodated in the substrate accommodation portion 71 is covered from the side direction by the bottom surface portion 56 of the lamp housing 52, and the control substrate 69 is shielded by the substrate accommodation portion 71 and the lamp housing 52. Therefore, the influence of noise generated in the control substrate 69 on each device or each instrument provided in the aircraft 100 may be suppressed.

In the state where the lamp unit 66 is attached to the lamp housing 52, the lamp housing 52 and the cover 53 may be coupled with each other by a dropout prevention wire 85. Both end portions of the dropout prevention wire 85 are attached to, for example, the inner surface of the bottom surface portion 56 of the lamp housing 52 and the inner surface of the retainer 63 of the cover 53. The dropout prevention wire 85 is positioned between the inner peripheral surface 57a of the lamp housing 52 and the outer peripheral surface 67a of the lamp unit 66, and at least a part thereof is positioned between the inner peripheral surface 57a of the lamp housing 52 and the fin forming portion 77 (see FIG. 10).

In the aircraft lamp 51, the lamp unit 66 is detachable with respect to the lamp housing 52, and thus, the lamp unit 66 may be separated from the lamp housing 52 by releasing the screwed state of the attaching screws 90, 90, . . . with respect to the screw holes 52b, 52b, . . . of the lamp housing 52 in a state where the cover 53 is separated from the lamp housing 52.

At this time, since the lamp housing 52 and the cover 53 are connected with each other by the dropout prevention wire 85 (see FIG. 9), the falling of the cover 53 is prevented by the dropout prevention wire 85 when the cover 53 is separated from the lamp housing 52, and thus, it is possible to prevent the cover 53 from being broken or being damaged.

Further, in a state where the light source module 68 is attached to the attaching portion 76 positioned inside the outer peripheral surface 67a of the lamp unit 66, and the lamp unit 66 is attached to the lamp housing 52, the dropout prevention wire 85 is positioned between the inner peripheral surface 57a of the lamp housing 52 and the outer peripheral surface 67a of the lamp unit 66 (see FIG. 10).

Therefore, since the light irradiated from the light source module 68 is not shielded by the dropout prevention wire 85, a good irradiation state of the light from the light source module 68 may be secured.

In particular, since the dropout prevention wire 85 is positioned between the inner peripheral surface 57a of the lamp housing 52 and the fin forming portion 77, the power receiving connector 70 and the dropout prevention wire 85 hardly interfere with each other, and the dropout prevention wire 85 does not hinder the detachment of the connection connector 62 with respect to the power receiving connector 70, and thus, it is possible to improve workability in the connection work of the connection connector 62 to the power receiving connector 70.

The prevention wire 85 is configured such that a metal line is covered with a resin tube and annular terminals provided in both end portions electrically connect the retainer 63 and the lamp housing 52, which are made of a metal material, with each other. Further, the lamp housing 52 is electrically connected to a predetermined structure member provided in the aircraft and is connected to the airframe of the aircraft by a ground wire. Therefore, when a thunderbolt occurs in the vicinity of the cover 53, it is possible to release electricity to the airframe of the aircraft via the dropout prevention wire 85 and the lamp housing 52. Therefore, the dropout prevention wire 85 has a function of protecting the light sources 79, 79, . . . of the light source module 68 and the electronic parts 69b, 69b, . . . of the control substrate 69 from a surge voltage.

Further, in the aircraft lamp 51, it may be configured such that, by attaching, for example, a washer (not illustrated) made of, for example, silicon to the screw shaft portion of the attaching screw 90, when the lamp unit 66 is separated from the lamp housing 52, the attaching screw 90 does not fall from the lamp unit 66 by the washer.

With this configuration, since the attaching screw 90 does not fall from the lamp unit 66, the attaching screw 90 and the lamp unit 66 do not fall from the lamp housing 52 in a state where the attaching screw 90 is unscrewed with respect to the screw hole 52b, and thus, it is possible to protect the lamp unit 55. The lamp unit 66 may be separated and removed from the lamp housing 52 by separating the washer from the screw shaft portion of the attaching screw 90.

When the lamp unit 66 is detached with respect to the lamp housing 52, a finger of an operator or a jig such as a driver is inserted to the arrangement space 55. Therefore, the arrangement space 55 also functions as a working space when performing the detachment work of the lamp unit 66 with respect to the lamp housing 52.

In the aircraft lamp 51 configured as described above, when light is emitted from the light sources 79, 79, . . . , the emitted light is controlled by the control lens portions 80b, 80b, . . . of the inner lens 80, passes through a part of the arrangement space 55 from the inner lens 80 to be transmitted through the transmission cover portion 64 of the cover 53, and is irradiated to the main wings 400 and 400, and the engines 500 and 500 attached to the main wings 400 and 400, respectively (see FIG. 7). A part of the arrangement space 55 through which the light emitted from the light sources 79, 79, . . . passes becomes a space 55a for the optical path, and at least a part of the space 55a for the optical path coincides with the working space when performing the detachment work of the lamp unit 66 with respect to the lamp housing 52.

The light is irradiated from the aircraft lamp 51 to the main wings 400 and 400 and the engines 500 and 500, and thus, it is possible for a pilot of the aircraft 100 to inspect whether snow or ice is adhered to the engines 500 and 500 or the portions around the engines 500 and 500 with the naked eye.

As disclosed above, in the aircraft lamp 51, the lamp outer housing 54 that is configured by the lamp housing 52 and the cover 53, and includes the internal space formed as the arrangement space 55, and the lamp unit 66 that includes the light source module 68, the attaching base 67, the power receiving connector 70, and the control substrate 69, and is detachable with respect to the lamp housing 52 via the opening 52*a* are provided.

Therefore, since it is possible to detach the lamp unit 66 including the light source module 68, the attaching base 67, the power receiving connector 70, and the control substrate 69 with respect to the lamp housing 52 by separating the cover 53 from the lamp housing 52, the maintainability of the lamp unit 66 may be improved, and a good lighting state of the light irradiated from the lamp unit 66 may be secured.

Further, the attaching base 67 is provided with the heat radiation fins 77*a*, 77*a*, . . . so that the heat generated in the light source module 68 and the heat generated in the control substrate 69 are released from the attaching base 67.

Therefore, since both the heat generated in the light source module 68 and the heat generated in the control substrate 69 are released from the heat radiation fins 77*a*, 77*a*, . . . of the attaching base 67, a separate member is not required to release the heat generated in the light source module 68 and the heat generated in the control substrate 69, respectively, and thus, it is possible to improve the heat radiation efficiency in a state where the number of parts is reduced.

Further, a part of the arrangement space 55 becomes the space 55*a* for the optical path, which is a path of the light irradiated from the light source module 68, and at least a part of the working space which is a space to which a finger is inserted when the lamp unit 66 is detached with respect to the lamp housing 52 coincides with the space 55*a* for the optical path.

Therefore, it is unnecessary to separately form the space 55*a* for the optical path, which is a path of the light irradiated from the light source module 68, and the working space to which, for example, a finger is inserted when the lamp unit 66 is detached with respect to the lamp housing 52 in the lamp housing 52, and thus, the aircraft lamp 51 may be miniaturized.

In the above, the example in which one light source module 68 is provided in the lamp unit 66 is illustrated. However, the number of the light source module 68 provided in the aircraft lamp 51 is not limited to one, but may be a plurality.

DESCRIPTION OF SYMBOLS

1: aircraft lamp
2: lamp housing
3: cover
4: lamp outer housing
5: first arrangement space
9: arrangement case portion
9*b*: cable insertion hole
11*a*: insertion hole
17: lamp unit
18: attaching base
19: light source module
20: control substrate
21: power receiving connector
23: shielding cover portion
24: substrate accommodation portion
25: inclined surface portion
25*a*: one surface
25*b*: the other surface
31: heat radiation fin
32: substrate
33: light source
39: heat transfer sheet
40: dropout prevention wire
51: aircraft lamp
52*a*: opening
52: lamp housing
53: cover
54: lamp outer housing
55: arrangement space
55*a*: space for an optical path
57*a*: inner peripheral surface
62: connection connector
66: lamp unit
67: attaching base
67*a*: outer peripheral surface
68: light source module
69: control substrate
70: power receiving connector
76: attaching portion
77*a*: heat radiation fin
79: light source
85: dropout prevention wire
100: aircraft

What is claimed is:

1. An aircraft lamp comprising:
   a lamp outer housing configured by a lamp housing having an opening and a cover attached to the lamp housing in a state where the opening is closed, an internal space being formed in the lamp outer housing as a first arrangement space; and
   a lamp body including a light source body provided with a light source, an attaching base to which the light source body is attached, and a power receiving connector attached to the attaching base to supply power to the light source, the lamp body being configured to be detachable with respect to the lamp housing,
   wherein the lamp housing includes an insertion hole communicating with the first arrangement space,
   the lamp housing is provided with an arrangement case having a second arrangement space opened on an outer surface side of the lamp housing,
   at least a part of the light source body is arranged in the first arrangement space such that the light source body is detachable with respect to the lamp housing through the insertion hole, and
   the power receiving connector is arranged in the second arrangement space.

2. An aircraft lamp comprising:
   a lamp outer housing configured by a lamp housing having an opening and a cover attached to the lamp housing in a state where the opening is closed, an internal space being formed in the lamp outer housing as a first arrangement space; and
   a lamp body including a light source body provided with a light source, an attaching base to which the light source body is attached, and a power receiving connector attached to the attaching base to supply power to the light source, the lamp body being configured to be detachable with respect to the lamp housing, wherein the lamp housing includes an insertion hole communicating with the first arrangement space, the lamp housing is provided with an arrangement case having a second arrangement space opened on an outer surface side of the lamp housing, at least a part of the light source body is arranged in a state where the insertion hole is inserted in the first arrangement space, and the power receiving connector is arranged in the second arrangement space, the attaching base is provided with a substrate accommodation having an arrangement recess and a shielding cover that closes the arrangement recess, a control substrate is arranged in the arrangement recess to control an ON/OFF of the light source, and the power receiving connector is attached to a surface of the shielding cover opposite to the arrangement recess.

3. The aircraft lamp according to claim 1, wherein the attaching base is provided with an inclined surface inclined with respect to the cover, and a heat radiation fin protruding from one surface of the inclined surface in a thickness direction, and the light source body includes a substrate on which a plurality of the light sources is mounted, and is attached to a remaining surface of the inclined surface in the thickness direction.

4. The aircraft lamp according to claim 1, wherein an outer peripheral of the attaching base is pressed against the lamp housing via an annular heat transfer sheet in a state where the lamp body is attached to the lamp housing.

5. The aircraft lamp according to claim 1, further comprising:

a dropout prevention wire configured to prevent the lamp body from dropping out from the lamp housing in a state where the lamp body is separated from the lamp housing, wherein both ends of the dropout prevention wire are attached to an outer surface of the lamp housing and an outer surface of the lamp body, respectively.

6. The aircraft lamp according to claim 1, wherein at least one of the light source body, the attaching base, and the power receiving connector of the lamp body is configured to be detachable with respect to the lamp housing from the outer surface side of the lamp housing.

* * * * *